May 11, 1948.  L. M. POTTS  2,441,207
PRINTING TELEGRAPH TAPE LOOP INDICATOR
Filed April 27, 1946
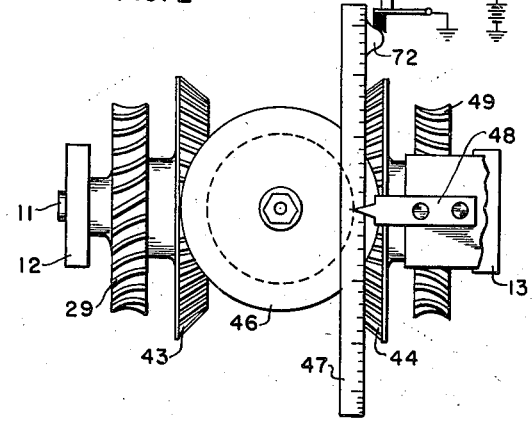
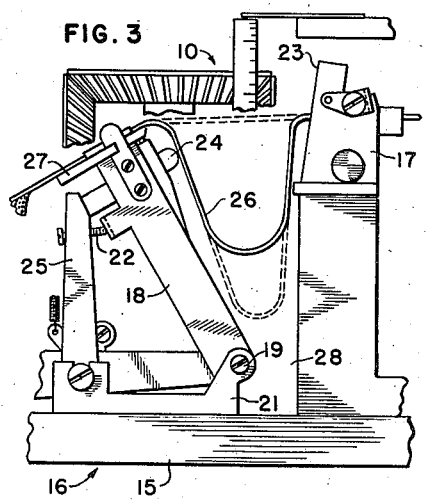
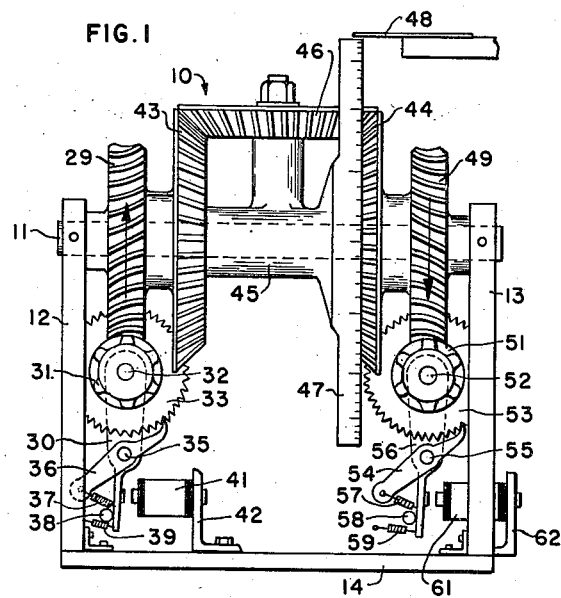
INVENTOR
LOUIS M. POTTS, DECEASED
MARTHA W. C. POTTS, EXECUTRIX
BY Emery Robinson
ATTORNEY Patented May 11, 1948

2,441,207

UNITED STATES PATENT OFFICE 2,441,207

PRINTING TELEGRAPH TAPE LOOP INDICATOR

Louis M. Potts, deceased, late of Evanston, Ill., by Martha W. C. Potts, executrix, Evanston, Ill., assignor to Teletype Corporation, Chicago, Ill., a corporation of Delaware Application April 27, 1946, Serial No. 665,539

1 Claim. (Cl. 178—80)

This invention pertains to metering devices and more particularly to a tape loop measuring and indicating arrangement.

The primary object of the present invention is to provide facilities for constantly indicating the length of tape accumulated between two tape actuating devices.

Another object of the invention is to provide a tape loop meter comprising a differential gear connection between two tape actuating devices, and indicating means operable to indicate the resultant actuations of said devices as determined by said differential.

Specifically, the apparatus for accomplishing the objects of the invention includes a perforating device and a pivoted transmitting device capable of permitting the transmission of the last code signal combination perforated. Such a structure is disclosed in U. S. Patent No. 2,348,214, issued May 9, 1944, to E. A. Gubisch, wherein a tape is adapted to be perforated, and then passed into a transmitting device of the pivoted type shown in U. S. Patent No. 2,262,012, issued November 11, 1941, to R. A. Lake. In the arrangements according to said patents, the transmitter and perforator are so positioned as to enable a loop of tape to be accumulated therebetween, which loop is lengthened or shortened depending upon whether the transmitter or perforator operates more rapidly.

To continuously apprise the operator as to the amount of tape accumulated or stored between the transmitter and perforator units, the indicator according to the present invention is provided, which is adapted to operate additively or subtractively depending upon whether tape is being stored or withdrawn from the loop. Moreover, the indicator is also adapted to register the fact that a balance exists between the transmitter and perforator when said units are operating at the same speeds.

For a more complete understanding of the foregoing objects and features of the present invention reference may be had to the following detailed description taken in conjunction with the accompanying drawings wherein:

Fig. 1 is an elevational view of the tape loop metering device according to the present invention;

Fig. 2 is a partial top view of the device according to the invention;

Fig. 3 is a front view of a portion of the apparatus shown in U. S. Patent No. 2,348,214, wherein the apparatus of the present invention is embodied, and Fig. 4 is a schematic view showing the circuit connections between the apparatus shown in said Patent No. 2,348,214 and the device according to the present invention.

Having reference to the drawings the loop indicating device according to the invention is indicated generally by the numeric 10, and comprises a shaft 11 which is journalled in supports 12 and 13 suitably mounted on a base plate 14. The assembly 10 is adapted to be positioned on the base portion 15 of the apparatus shown in said Patent No. 2,348,214, which apparatus is indicated generally in Fig. 3 by the numeric 16. The apparatus 16 comprises a perforating unit 17, analogous to unit 67 in Patent No. 2,348,214, and the pivoted transmitter unit 18 is analogous to unit 17 in said patent. As fully described in Patent No. 2,348,214 the unit 18 is mounted pivotally on a pivot 19 journalled in a bracket 21 suported on the base portion 15.

The unit 18 is swingable between a suitably mounted stop 22 and the inclined surface 23 of the perforator 17. A pair of tape supporting fingers 24 (only one of which is shown) are carried on the bracket 25 and are adapted to project through the unit 18. Fingers 24 serve to support the tape 26 and sustain the weight of the tape loop between the unit 18 and the perforator 17 thereby preventing the bending of the tape 26 over the plate 27 of the unit 18.

As set forth in said Patent No. 2,348,214, the perforator unit 17 and transmitting unit 18 are provided with tape advancing means, such that if the perforator alone is operating, a loop of tape will form in the space indicated by the numeric 28, and if the transmitter 18 alone operates, the loop 26 will decrease in size. If the transmitter 18 and perforator 17 are operating at the same speed, the size of the loop 26 will, of course, remain constant. With the device according to the present invention the length of the loop existing between units 17 and 18 is constantly registered regardless of the speed variation between said units.

Referring to Fig. 1, there is freely mounted on shaft 11, a worm gear 29 adapted to mesh with a worm 31 fixed to a cross shaft 32. Also fixed to shaft 32 is a ratchet wheel 33. Freely mounted on shaft 32 is an arm 30 on which is pivoted at 35, a pawl 36 which is adapted to cooperate with ratchet wheel 33. Pawl 36 is normally biased counterclockwise into cooperative engagement with ratchet wheel 33 by a spring 37. Arm 30 is normally biased clockwise against a stop 38 by a spring 39. An electromagnet 41 carried on a bracket 42 cooperates with the lower end of arm 30, so that upon energization of magnet 41 the arm 30 is rotated counterclockwise whereupon pawl 36 is caused to impart counterclockwise rotation to ratchet wheel 33. Corresponding rotation is imparted to worm 31, which in turn will impart rotation to worm wheel 29 in the direction indicated by the arrow.

Integrally connected with worm gear 29 is a bevel gear 43. A bevel gear 44, similar to gear 43, as freely mounted on shaft 11, and positioned between gears 43 and 44 and freely rotatable on shaft 11 is a member 45 which carries thereon a planetary bevel gear 46 having meshing engagement with gears 43 and 44. Integrally connected to member 45 is ring 47 having graduations around the periphery thereof. An index pointer 48 is appropriately mounted to cooperate with the graduations on the ring 47.

A worm gear 49 is integrally associated with gear 44. Gear 49 meshes with a worm 51 fixed to a shaft 52 suitably journalled in brackets (not shown) carried on frame member 13. Fixed to shaft 52 is a ratchet 53 which cooperates with a pawl 54 carried on a pivot 55 on an arm 56 freely mounted on shaft 52. Pawl 54 is biased by a spring 57 into engagement with ratchet 53. Arm 56 is normally held against a stop 58 by a spring 59.

An electromagnet 61 which is cooperatively associated with the extremity of arm 56, is supported by a bracket 62 mounted on base 14. Magnet 61 upon energization operates arm 56 counterclockwise to effect through pawl 54, the rotation of ratchet 53, which in turn, through shaft 52 and worm 51 imparts rotation to worm gear 59 and hence gear 44.

If magnet 41 alone is operating, the ring 47 will rotate in the direction of the arrow shown on gear 29. Should the magnet 61 alone be in operation, the ring 47 will rotate in the direction indicated by the arrow shown on gear 49. If both of the magnets 41 and 61 are operating, then the direction of rotation of ring will be a resultant dependent upon the ratio of the speeds of gears 29 and 49.

In Fig. 4, the unit 10 is indicated schematically in dot and dash line rectangle and only the magnets 41 and 61 and their respective circuits are shown. Also shown schematically in Fig. 4 are the portions of the apparatus illustrated in U. S. Patent 2,348,214 which are utilized to achieve the objects of the present invention. The portions which are identical will be given herein the same numerics as are employed in said patent. For example, the main shaft 34 is driven from a motor in the manner shown in said patent. A clutch on shaft 34 for operation of the perforator comprises a driving portion 107 and a driven portion 108.

Power is transmitted from shaft 34 to a cross shaft 211 through a pair of gears 208 and 209, respectively, and then from shaft 211 to a transmitter shaft 317 through a pair of gears 214 and 318. A clutch comprising a driving member 319 and a driven member 320 is carried on shaft 317. Sleeved to the driven clutch member 108 on shaft 34 is a contact operating cam 63 (added for the purpose of the present invention), which is adapted to cyclically operate a contact 64 to complete an energizing circuit for magnet 61 extending from ground, through contact 64, over conductor 65, through the winding of magnet 61 and to grounded battery 66.

Similarly, there is sleeved to the driven clutch member 320, a cam 67 which is adapted to cyclically operate a contact 68 to complete an energizing circuit for magnet 41 extending from ground, through contact 68, over conductor 69, through the winding of magnet 41, and to grounded battery 71.

In the operation of the arrangement according to the present invention, the apparatus is so arranged that at the start there is no loop of tape in the machine, that is, the transmitter 18 is abutting the perforator 17. Moreover, the scale on the periphery of ring 47 is set so that the zero indication is opposite the pointer 48. Upon the operation of the perforator 17, tape is fed into the space 28 to form a loop therein, provided the transmitter 18 is as yet not operating, or in the event the perforator is operating at a greater speed than the transmitter. Assuming that a loop of tape has been accumulated in the space 28, and that the transmitter has begun to operate, the movement of the ring 47 will no longer be governed solely by the perforator 17, through the instrumentality of contact 64; but will now be governed by both the transmitter 18 and perforator 17, so that the indication on the scale will apprise the operator as to the length of tape between said units.

At some suitable point on the ring 47 there is provided a projection 72 which, when a certain length of loop is indicated, will close a contact 73 to light a supervisory lamp 74 over an obvious circuit. In place of supervisory lamps there may be provided switches adapted to make changes in a circuit when a certain length of tape is provided in the loop. Such a change may consist in cutting in an additional transmitter or making other suitable circuit changes according to the system used.

The electromagnets 41 and 61, instead of being operated so as to indicate the length of the tape in the loop, may be used for indicating the number of messages, in which case the contacts 64 and/or 68 would respond to an end-of-message signal, and thus keep an account of the number of messages in the loop.

Although a specific embodiment of the invention has been disclosed, it is understood that the invention is capable of use in many forms other than that disclosed without departure from the spirit and scope of the invention as defined in the appended claim.

What is claimed is:

In combination, tape perforating means, tape controlled transmitting means having tape sensing means pivotally arranged in juxtaposed relation and movable with respect to said perforating means to facilitate accumulation of tape from zero length therebetween, tape stepping facilities associated with each of said perforating means and said sensing means, separate cyclic operating means for said perforating means and said transmitting means, cam operated contact means associated with each of said cyclic operating means, an electromagnet associated with each contact means, pawl and ratchet drive means associated with said electromagnets, a worm pinion driven by each of said drive means, a worm gear meshed with each pinion, a bevel gear integrally associated with each worm gear, a planetary gear operably meshed with said bevel gears, means for operably supporting said planetary gear for planetary action about said bevel gears, a ring integrally related to said supporting means and rotatable therewith, said ring bearing graduated indicia on the periphery thereof, and an indicator cooperating with said indicia, whereby said indicator and said ring are effective to indicate continuously the accumulation of tape between said perforating means and said transmitting means as determined by both of said tape actuating facilities.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
| --- | --- | --- |
| 1,264,378 | Dixon | Apr. 30, 1918 |
| 2,262,012 | Lake | Nov. 11, 1941 |
| 2,348,214 | Gubisch | May 9, 1944 |

FOREIGN PATENTS

| Number | Country | Date |
| --- | --- | --- |
| 208,410 | Germany | Mar. 25, 1919 |
| 21,311 | Great Britain | Nov. 9, 1893 |